United States Patent
DeMaria et al.

[15] 3,636,474
[45] Jan. 18, 1972

[54] ULTRASHORT OPTICAL PULSE GENERATION UTILIZING LASER-PUMPED LASERS

[72] Inventors: Anthony J. DeMaria, West Hartford; William H. Glenn, Vernon, both of Conn.

[73] Assignee: United Aircraft Corporation, East Hartford, Conn.

[22] Filed: Nov. 27, 1968

[21] Appl. No.: 779,332

[52] U.S. Cl. ....................................................331/94.5
[51] Int. Cl. .....................................................H01s 3/09
[58] Field of Search..........................................331/94.5

[56] References Cited

UNITED STATES PATENTS 3,493,894  2/1970  Patel...................................307/88.3
3,527,955  9/1970  Brienza et al.....................307/88.3

OTHER PUBLICATIONS

Brienza et al., " Applied Physics Letters," Jan. 15, 1968, pp. 54–56.

*Primary Examiner*—Roy Lake
*Assistant Examiner*—Darwin R. Hostetter
*Attorney*—Donald F. Bradley

[57] ABSTRACT

A mode-locked laser generating a train of repetitive pulses is used to optically pump other lasers such as organic dye lasers. The repetitive pulses will provide an amplitude modulation of the gain of the pumped laser, and will mode-lock the oscillating modes of the pumped laser output, producing a series of repetitive pulses from the pumped laser.

8 Claims, 2 Drawing Figures

MODE-LOCKED OUTPUT

3,636,474

ULTRASHORT OPTICAL PULSE GENERATION UTILIZING LASER-PUMPED LASERS

BACKGROUND OF THE INVENTION

1. Field of the Invention

This invention relates to the generation of ultrashort optical pulses and particularly to the generation of ultrashort repetitive pulses from broad bandwidth lasers.

2. Description of the Prior Art

It is known that saturable absorbers having fast relaxation times can be used to simultaneously Q-switch and mode-lock certain lasers such as ruby and glass, and thereby obtain extremely short time duration repetitive pulses with extremely high peak powers. However, the range of frequencies available is limited at present to those few lasers which have adequate bandwidth to generate ultrashort pulses and which can be mode-locked by saturable absorbers.

In order to produce ultrashort repetitive pulses such as those generated by mode-locked lasers, a broad bandwidth lasing material is required. It is known that a large number of broad bandwidth organic dye solutions exhibit laser action when excited with a short-duration, high-intensity pump pulse. Pump pulses from Q-switched lasers and from specially constructed flash tubes have been employed. The output spectra from dye lasers are quite broad, extending in some cases over a few hundred angstroms.

This invention describes the mode-locking of lasers to produce very short repetitive pulses, picosecond or shorter, over a wide range of the visible spectrum. Specifically, mode-locking of an organic dye laser is achieved by pumping it with a train of pulses such as from another mode-locked laser.

While the invention is described in terms of organic dye lasers, it is apparent that the techniques described apply to all lasers which otherwise fulfill the conditions necessary for mode-locking.

SUMMARY OF THE INVENTION

A primary object of the present invention is to provide ultrashort laser pulses over a wide range of optical frequencies.

A further object of the present invention is to mode-lock a laser by modulating the gain of the laser.

In accordance with the present invention, a mode-locked laser such as ruby or glass is arranged to optically pump another laser such as an organic dye laser.

In one embodiment the pumping laser is positioned so that the repetitive pulses produced therefrom intersect the laser-pumped laser along its optical axis. In another embodiment the repetitive pulses from the mode-locked pumping laser intersect the laser-pumped laser at some angle such as 90° with respect to its optical axis. In both embodiments the gain of the laser-pumped laser will have a modulation or periodic variation with a period equal to the spacing between the repetitive pumping pulses. When the length of the feedback cavity of the laser-pumped laser is equal to or a multiple or submultiple of the length of the cavity of the pumping laser, the conditions for mode-locking the laser-pumped laser are satisfied, and the output of the laser-pumped laser will consist of a series of repetitive ultrashort pulses.

The invention permits the generation of repetitive pulses with any desired wavelength, greatly increasing the potential applications of ultrashort optical pulses as research tools in such scientific applications as lifetime measurements, spectroscopy, photography, etc., and in commercial applications such as optical computers, optical radar and optical countermeasures.

DESCRIPTION OF THE PREFERRED EMBODIMENT

Figure 1:
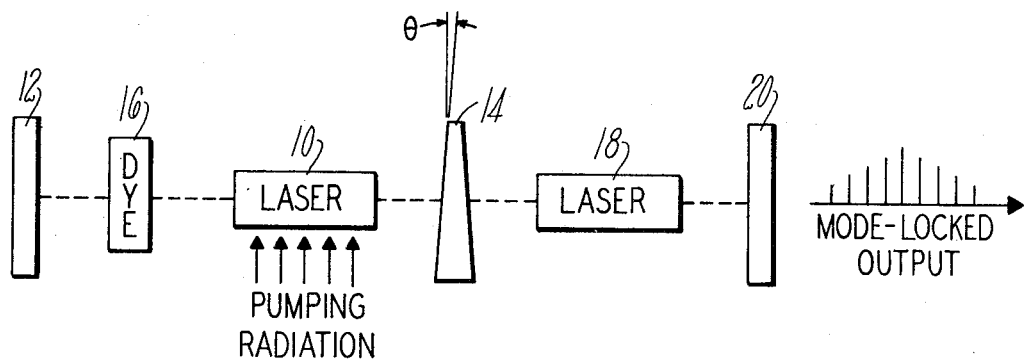
FIG. 1 is a schematic diagram of a mode-locked laser pumping a second laser along its optical axis.

Referring particularly to FIG. 1, a laser element 10 such as a ruby or glass laser is inserted into an optical feedback cavity comprising mirrors 12 and 14. Also included in the cavity in the path of the laser radiation is a cell 16 filled with an appropriate bleachable dye which serves to mode-lock the laser and produce a train of output pulses by virtue of the saturable dye acting as an optical expandor element. Mode-locking of a laser by means of a saturable dye is well known and need not be described in detail. For additional information on mode-locking by use of a dye, reference may be made to copending application Ser. No. 536,898 entitled "Self Mode-Locking Of Lasers Using Dyes," filed Mar. 23, 1966 by Anthony J. DeMaria et al.

Laser 10 when mode-locked by the bleachable dye in cell 16 will generate a train of pulses. The left side of mirror 14 constitutes the output reflector for laser 10 and has a reflectivity typically between 50–90 percent. Mirror 12 typically has a high reflectivity at the wavelength of laser 10.

The right side of mirror 14 constitutes one of the reflectors for a laser 18 which may be an organic dye laser. The other reflector for laser 18 is mirror 20. The right side of mirror 14 should have as high a reflectivity as possible at the wavelength of laser 18 and as low a reflectivity as possible at the wavelength of laser 10. The reflectivity requirement for mirror 14 may be satisfied by coatings on two sides of the mirror, by a single coating or by the use of two distinct and separate mirrors. If a harmonic of laser 10 is used to pump laser 18, two separate mirrors with an intervening harmonic generator crystal are required.

The two sides of mirror 14 may be nonparallel by a small angle $\theta$. Mirror 12 and the left side of mirror 14 are adjusted for plane parallelism, and the right side of mirror 14 and mirror 20 are adjusted for parallelism. The angle $\theta$ may be desirable to prevent back reflections from the right-hand side of mirror 14 or from other elements in the cavity of laser 18 from passing back through laser 10. Mirror 20 has a relatively low reflectivity for the wavelength of laser 18 and constitutes the output mirror for the system. Mirror 20 should also have a very low reflectivity for the wavelengths of laser 10.

Laser 10 is pumped by any suitable source, not shown, and the repetitive train of pulses generated thereby pass through mirror 14 and into laser 18. The pulses act as a pumping source for laser 18, and the gain of laser 18 will have a periodic variation with a period equal to the spacing between the repetitive pumping pulses.

If the length of the cavity of laser 18, that is, the distance between mirrors 14 and 20, is equal to or a multiple or submultiple of the length of the cavity of laser 10, then the well-known mode-locking condition will be satisfied and the output from laser 18 will consist of a repetitive series of pulses.

As an example, Rhodamine 6G and Rhodamine B have been used in ethanol solution as the dye solution for laser 18. These dyes have absorption peaks at 5,260 and 5,500 A. respectively. The peaks are sufficiently broad to permit efficient pumping with the 5,300 A. second harmonic of a Nd-glass laser. The Nd-glass laser may be mode-locked by an Eastman Kodak 9740 dye. The output from the dye laser consisted of a train of subnanosecond pulses spaced by $5 \times 10^{-9}$ seconds. Typical dye concentrations in the laser 18 were about $5 \times 10^{-5}$M. Lasing was observed with the optical length of the cavity of laser 18 equal to 1, ½ and ⅓ times the length of the pumping laser cavity.

It is apparent that other types of lasers may be mode-locked in the manner described. Any multimode laser which can be gain modulated at or near its optical wavelength by repetitive pulses from another source such as a mode-locked laser may be mode-locked in this way, and will produce a train of repetitive ultrashort pulses. Organic dyes are particularly attractive because of their broad bandwidth which will produce short output pulses, and because of the large number of organic dyes which may be mixed in various solutions to produce any desired wavelength output. Furthermore, organic dye lasers because of their rapid decay times are more difficult to lase by ordinary methods. Also, organic dye lasers are frequency tunable by varying the concentrations of the dye or the solution, by adding another dye to the solution, or by the use of a wavelength selective reflector as one of the cavity mirrors.

Figure 2:
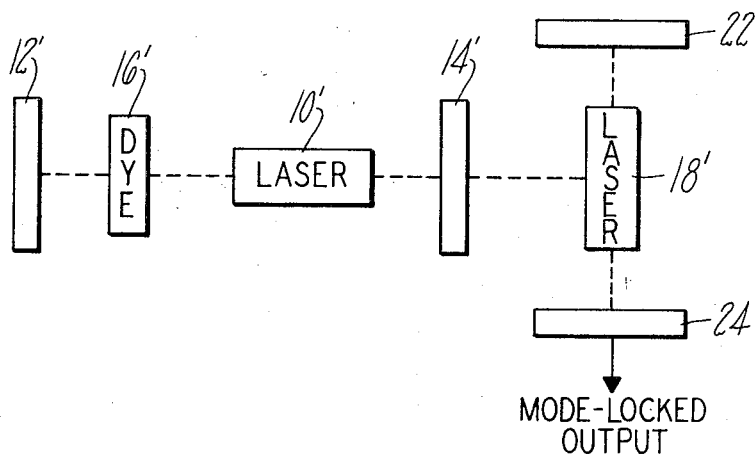
FIG. 2 is a schematic diagram of a mode-locked laser pumping a second laser at 90° to its optical axis.

FIG. 2 shows another embodiment of the invention. The laser 18' is pumped by a repetitive train of pulses produced by mode-locked laser 10' whose axis is at some angle such as 90° with respect to the axis of laser 18'. The feedback cavity for laser 18' is formed by mirrors 22 and 24, and the feedback cavity for laser 10' is formed by mirrors 12' and 14'. Dye cell 16' is included in the cavity of laser 10'.

The arrangement of FIG. 2 is of most utility when the wavelength of laser 18' is close to the wavelength of the pumping laser 10'. When this occurs it may be difficult to obtain the required high and low reflectivities at the two wavelengths required in the two optical cavities of FIG. 1. Because the repetitive pulses from laser 10' intersect only a small portion of laser 18' and hence modulate the gain in laser 18' only along this small portion, it may be necessary for uniform pumping to insert an optical lens arrangement between the output of laser 14' and laser 18' in order to broaden the area at which the repetitive pulses intersect laser 18'.

Some lasers have absorption bands at wavelengths not matching the wavelengths of pumping lasers presently available such as ruby and Nd-glass. For these cases, second harmonic generators can be utilized to double the frequency of the pumping lasers. Media that are known to be capable of the simulated Raman effect can also be utilized to pump the laser at other wavelengths.

Thus repetitive pulses from a source such as a mode-locked laser can be utilized to optically pump a laser to obtain repetitive pulses at any desired frequency. The repetitive ultrashort pulses will provide an amplitude modulation of the gain of the pumped laser, which in turn will phase lock the oscillating modes of the pumped laser output. The interference of these modes will cause the output of the pumped laser to consist of a series of ultrashort repetitive pulses.

It is to be understood that the invention is not limited to the specific embodiment herein illustrated and described but may be used in other ways without departure from its spirit as defined by the following claims.

We claim:

1. A method for producing mode-locked output pulses from an organic dye laser comprising the steps of
   generating a train of mode-locked pulses from a first laser at the pumping wavelength of said organic dye laser,
   inserting said organic dye laser in an optical feedback cavity of a length equal to an integral multiple or submultiple of the cavity length of said first laser,
   and directing the mode-locked pulses from said first laser to intersect at least a portion of said organic dye laser to modulate the gain thereof.

2. A method as in claim 1 and including the step of directing the mode-locked pulses from said first laser to intersect said organic dye laser along the optical axis thereof.

3. A method as in claim 1 in which said organic dye laser is in solution, and including the step of varying the mixture of said solution to vary the spectral output from said organic dye laser.

4. Apparatus for producing a train of mode-locked pulses from an organic dye laser comprising
   a first laser including an optical feedback cavity for generating a train of mode-locked pulses at the pumping wavelength of said organic dye laser,
   an optical feedback cavity for said organic dye laser having a length which is an integral multiple or submultiple of the cavity length of said first laser,
   and means for directing said mode-locked pulses from said first laser to intersect said organic dye laser and to modulate the gain of at least a portion of said organic dye laser to produce a train of mode-locked laser pulses from said organic dye laser having a wavelength which is an integral multiple or submultiple of the wavelength of said mode-locked pulses from said first laser.

5. Apparatus as in claim 4 in which the mode-locked pulses from said first laser intersect said organic dye laser along its optical axis.

6. Apparatus as in claim 4 in which said organic dye laser is a solution, and consists of a mixture of organic dyes selected to produce a desired spectral output from said organic dye laser.

7. Apparatus for producing a train of mode-locked pulses from an organic dye laser comprising
   a first laser,
   an optical feedback cavity for said first laser including first and second mirrors,
   means for producing a train of mode-locked pulses from said first laser,
   a feedback cavity for said organic dye laser including third and fourth mirrors spaced apart a distance equal to an integral multiple or submultiple of the distance between said first and second mirrors,
   and means for directing said mode-locked pulses from said first laser to intersect said organic dye laser along its optical axis and modulate the gain of said organic dye laser to produce therefrom a train of mode-locked pulses having a wavelength which is an integral multiple or submultiple of the wavelength of the mode-locked pulses from said first laser.

8. Apparatus as in claim 7 in which said second and third mirrors comprise a single transmissive element with reflective coatings on two opposite faces thereof, said faces being out of parallel from each other by a small angle.

* * * * *